United States Patent
Förster (10) Patent No.: US 9,636,719 B2
(45) Date of Patent: May 2, 2017

(54) SYSTEMS AND METHODS FOR TREATING WORKPIECES

(71) Applicant: DÜRR ECOCLEAN GMBH, Filderstadt (DE)

(72) Inventor: Michael Förster, Eupen (BE)

(73) Assignee: Dürr Ecoclean GMBH, Filderstadt (DK)

( * ) Notice: Subject to any disclaimer, the term of this patent is extended or adjusted under 35 U.S.C. 154(b) by 0 days.

(21) Appl. No.: 14/856,835

(22) Filed: Sep. 17, 2015

(65) Prior Publication Data

US 2016/0001335 A1    Jan. 7, 2016

Related U.S. Application Data

(63) Continuation-in-part of application No. PCT/EP2014/055879, filed on Mar. 24, 2014.

(30) Foreign Application Priority Data

Apr. 16, 2013  (DE) .......................... 10 2013 206 875

(51) Int. Cl.
*B08B 3/00* (2006.01)
*B08B 7/04* (2006.01)
(Continued)

(52) U.S. Cl.
CPC .................. *B08B 7/04* (2013.01); *B08B 3/04* (2013.01); *B08B 3/047* (2013.01); *B08B 3/048* (2013.01);
(Continued)

(58) Field of Classification Search
CPC .. B08B 7/04; B08B 3/04; B08B 3/048; B08B 3/10; B08B 1/002; B08B 3/024; B08B 13/00; B25J 21/00; F26B 19/00
(Continued)

(56) References Cited

U.S. PATENT DOCUMENTS

2011/0041881 A1*  2/2011  Leyendecker ......... B25J 11/006
                                                                    134/137

FOREIGN PATENT DOCUMENTS

CN      103009394       4/2013
DE         234823       4/1986
(Continued)

OTHER PUBLICATIONS

Patent Cooperation Treaty, English Translation of "International Preliminary Report on Patentability", issued in connection with PCT Application No. PCT/EP2014/055879, mailed on Oct. 29, 2015, (8 pages).

(Continued)

*Primary Examiner* — Duy Deo
*Assistant Examiner* — Maki Angadi
(74) *Attorney, Agent, or Firm* — Hanley, Flight & Zimmerman, LLC (57) ABSTRACT

Example systems and methods for treating workpieces are disclosed. In some examples, the system includes a treatment station positioned in a process chamber for treating the workpiece with fluid. The example system includes a handling device positioned in the process chamber. The example handling device includes a base positioned in the process chamber, a supporting arm coupled to the base and pivotable relative to the base about a first pivot axis, a pivoting arm coupled to the supporting arm and pivotable relative to the supporting arm about a second pivot axis, and a receptacle coupled to the pivoting arm and including a workpiece holder capable of picking up the workpiece from a workpiece feeder positioned outside of the process chamber. The example handling device is capable of moving the workpiece through an opening of the process chamber and into a treatment position at the treatment station.

19 Claims, 11 Drawing Sheets

(51) Int. Cl.
*B25J 21/00* (2006.01)
*B08B 3/04* (2006.01)
*B08B 3/10* (2006.01)
*B08B 13/00* (2006.01)
*F26B 19/00* (2006.01)
*B08B 1/00* (2006.01)
*B08B 3/02* (2006.01)

(52) U.S. Cl.
CPC ........... *B08B 3/10* (2013.01); *B08B 13/00* (2013.01); *B25J 21/00* (2013.01); *F26B 19/00* (2013.01); *B08B 1/002* (2013.01); *B08B 3/024* (2013.01)

(58) Field of Classification Search
USPC ...... 134/26, 34, 44, 50, 55, 95.1, 95.2, 95.3, 134/135, 137
See application file for complete search history.

(56) References Cited

FOREIGN PATENT DOCUMENTS

| DE | 4342593 | 6/1995 |
|---|---|---|
| DE | 19712513 | 10/1998 |
| DE | 19956343 | 5/2001 |
| DE | 10004519 | 8/2001 |
| DE | 10007831 | 8/2001 |
| DE | 102011078076 | 12/2012 |
| EP | 1563972 | 8/2005 |
| WO | 2012019782 | 2/2012 |
| WO | 2014170095 | 10/2014 |

OTHER PUBLICATIONS

Patent Cooperation Treaty, "Written Opinion", issued in connection with PCT Application No. PCT/EP2014/055879, mailed on Jun. 25, 2014, (5 pages).
Patent Cooperation Treaty, English Translation of "International Search Report", issued in connection with PCT Application No. PCT/EP2014/055879, mailed on Jun. 25, 2014, (2 pages).
German Patent Office, "Search Report", issued in connection with German Patent Application No. 10 2013 206 875.1, issued on Dec. 2, 2013, (5 pages).
Patent Cooperation Treaty, "International Search Report", issued in connection with PCT Application No. PCT/EP2014/055879, mailed on Jun. 25, 2014, (4 pages).
State Intellectual Property Office of the People'S Republic of China, "First Office Action," issued in connection with Chinese Patent Application No. 201480021412.1, mailed Oct. 21, 2016, 21 pages.

* cited by examiner

SYSTEMS AND METHODS FOR TREATING WORKPIECES

RELATED APPLICATION

This patent arises from a continuation-in-part of International Patent Application No. PCT/EP2014/055879, which was filed on Mar. 24, 2014, which claims priority to German Patent Application No. 10 2013 206 875.1, which was filed on Apr. 16, 2013. The foregoing International Patent Application and German Patent Application are hereby incorporated herein by reference in their entireties.

FIELD OF THE DISCLOSURE

This disclosure relates generally to systems and methods for treating and/or cleaning workpieces, and, more particularly, to systems and methods having and/or utilizing a handling device to pick up and move a workpiece from a workpiece feeder into a treatment position at a treatment station where the workpiece is to be treated and/or cleaned with a fluid.

BACKGROUND

Dirt particles such as, for example, chip material, dust, casting sand or liquid droplets, may impair the function of industrially produced products such as, for example, injection nozzles for internal combustion engines. The cleanliness of workpieces in industrial production processes is therefore of great importance.

Industrial manufacturing processes commonly utilize systems for treating workpieces in which the workpieces are cleaned and deburred. In such conventional treatment and/or cleaning systems, the workpieces are subjected to fluid, in particular to liquid such as, for example, water, which is preferably provided with cleaning additives, or to liquids which contain hydrocarbons. Gaseous fluids such as, for example, compressed air, are also used for treating and/or cleaning workpieces.

For safety and environmental protection reasons, workpieces are commonly treated in such conventional treatment and/or cleaning systems in fluid-tight process chambers. In order to ensure as uniform a treatment quality as possible and in order to permit treatment of heavy workpieces such as, for example, engine blocks, conventional treatment and/or cleaning systems use handling robots to move the workpieces. It is known to arrange such handling robots outside of a process chamber and to provide a fluid-tight lead-through device for the robot arms into the process chamber, thereby permitting the handling of workpieces in the process chamber by the handling robot.

It is also known to arrange handling robots in the interior of the process chamber. The handling robots used in conventional systems for treating workpieces have at least six driven movement axes. A workpiece picked up by such handling robots can be moved into a treatment position from a workpiece feeder to a workpiece treatment device capable of moving with six or more degrees of freedom. As a result of the multiplicity of driven movement axes, such handling robots have a large construction space and accordingly take up a large amount of space in the process chamber. Furthermore, the control of such handling robots is very complicated due to the numerous driven movement axes.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

The examples disclosed herein provide for a cost-effective and compact system for treating a workpiece. Particularly, the examples disclosed herein provide a system including a compact handling device positioned in a process chamber. The process chamber includes a treatment station for treating the workpiece. The handling device is capable of picking up a workpiece located outside of the process chamber and moving the workpiece into a treatment position at the treatment station.

In accordance with the teachings of this disclosure, an example system for treating a workpiece includes a process chamber having an opening that is closable in a fluid tight-manner. In some disclosed examples, the system includes a treatment station positioned in the process chamber for treating the workpiece with fluid. In some disclosed examples, the system includes a handling device positioned in the process chamber, the handling device including a base, a supporting arm that is coupled to the base and is pivotable relative to the base about a first pivot axis, a pivoting arm that is coupled to the supporting arm and is pivotable relative to the supporting arm about a second pivot axis, and a receptacle that is coupled to the pivoting arm. In some disclosed examples, the receptacle includes a workpiece holder capable of picking up the workpiece from a workpiece feeder positioned outside of the process chamber. In some disclosed examples, the handling device is capable of moving the workpiece from the workpiece feeder, through the opening of the process chamber, and into a treatment position at the treatment station.

Figure 1:
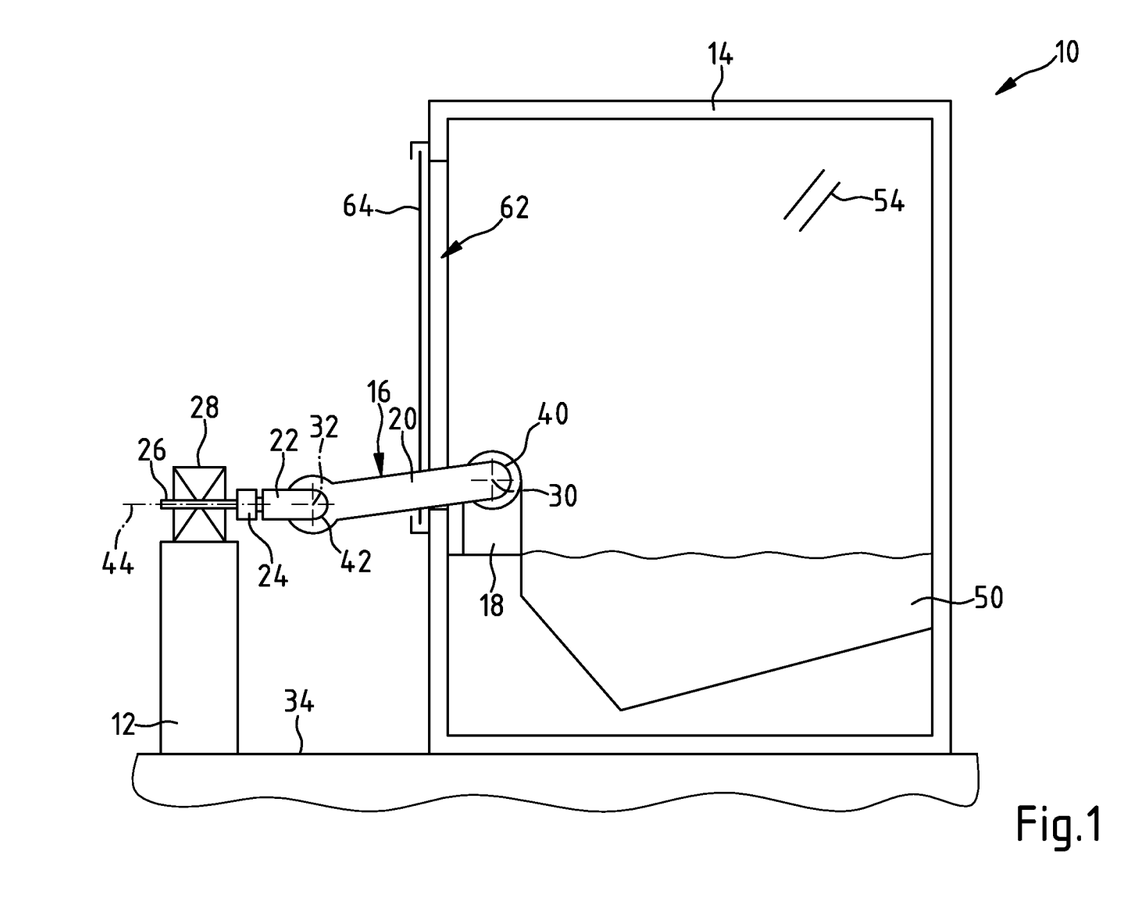
FIG. 1 shows a first example system having an example process chamber and an example handling device for treating an example workpiece.

FIG. 1 shows a first example system 10 having an example process chamber 14 and an example handling device 16 for treating an example workpiece 28. In the illustrated example, the system 10 is designed as a cleaning system. In the illustrated example, the handling device 16 is positioned within the process chamber 14. In the illustrated example, the process chamber 14 includes an example washing station 50. The washing station 50 provides for the injection flood washing of the workpiece 28. In the illustrated example, the process chamber 14 further includes an example drying station 54. The drying station 54 includes a nozzle system having a plurality of nozzles that permit the drying of the workpiece 28 with compressed air flowing out of the nozzles. In the illustrated example, the drying station 54 is spaced apart from the washing station 50.

In the illustrated example of FIG. 1, the handling device 16 is an industrial robot having an example immovable base 18 mounted in a fixed position in the example process chamber 14. The handling device 16 includes an example first pivot axis 30, an example second pivot axis 32, and an example third pivot axis 44. In the illustrated example, the handling device 16 provides for driven rotary movements about respective ones of the first pivot axis 30, the second pivot axis 32 and the third pivot axis 44. The base 18 of the handling device 16 is coupled to an example supporting arm 20 via an example first pivot joint 40. The example first pivot joint 40 acts as a main bearing. The supporting arm 20 is capable of being pivoted via the first pivot joint 40 about the first pivot axis 30. In the illustrated example, the first pivot axis 30 is positioned horizontally relative to an example floor 34 upon which the process chamber 14 rests.

In the illustrated example of FIG. 1, an example pivoting arm 22 is connected to the supporting arm 20 in an articulating manner via an example second pivot joint 42. The example second pivot joint 42 acts as a secondary bearing. The pivoting arm 22 is capable of being pivoted relative to the supporting arm 20 via the second pivot joint 42 about the second pivot axis 32. In the illustrated example, the second pivot axis 32 is positioned horizontally relative to the floor 34. In the illustrated example, the second pivot axis 32 is parallel to the first pivot axis 30.

In the illustrated example of FIG. 1, an example receptacle 24 is connected to the pivoting arm 22 at the end of the pivoting arm 22 that is opposite the second pivot axis 32. The receptacle 24 is mounted so as to be rotatable about the third pivot axis 44. In the illustrated example, the third pivot axis 44 lies in a plane that is vertical relative to the floor 34 and through which the first pivot axis 30 and the second pivot axis 32 respectively pass. In the illustrated example, the third pivot axis 44 and the second pivot axis 32 have a common intersecting point. In the illustrated example, the third pivot axis 44 is perpendicular to the second pivot axis 32 and the first pivot axis 30.

In the illustrated example of FIG. 1, an example workpiece holder 26 is connected to the receptacle 24. In the illustrated example, the workpiece holder 26 is designed as a gripper. The workpiece holder 26 is capable of picking up the example workpiece 28 from an example workpiece feeder 12.

In the illustrated example of FIG. 1, the process chamber 14 includes an example passage 62 that is capable of being opened and is further capable of being closed in a fluid-tight manner via an example closing device. In the illustrated example, the closing device is designed as an example sliding door 64.

Figure 2:
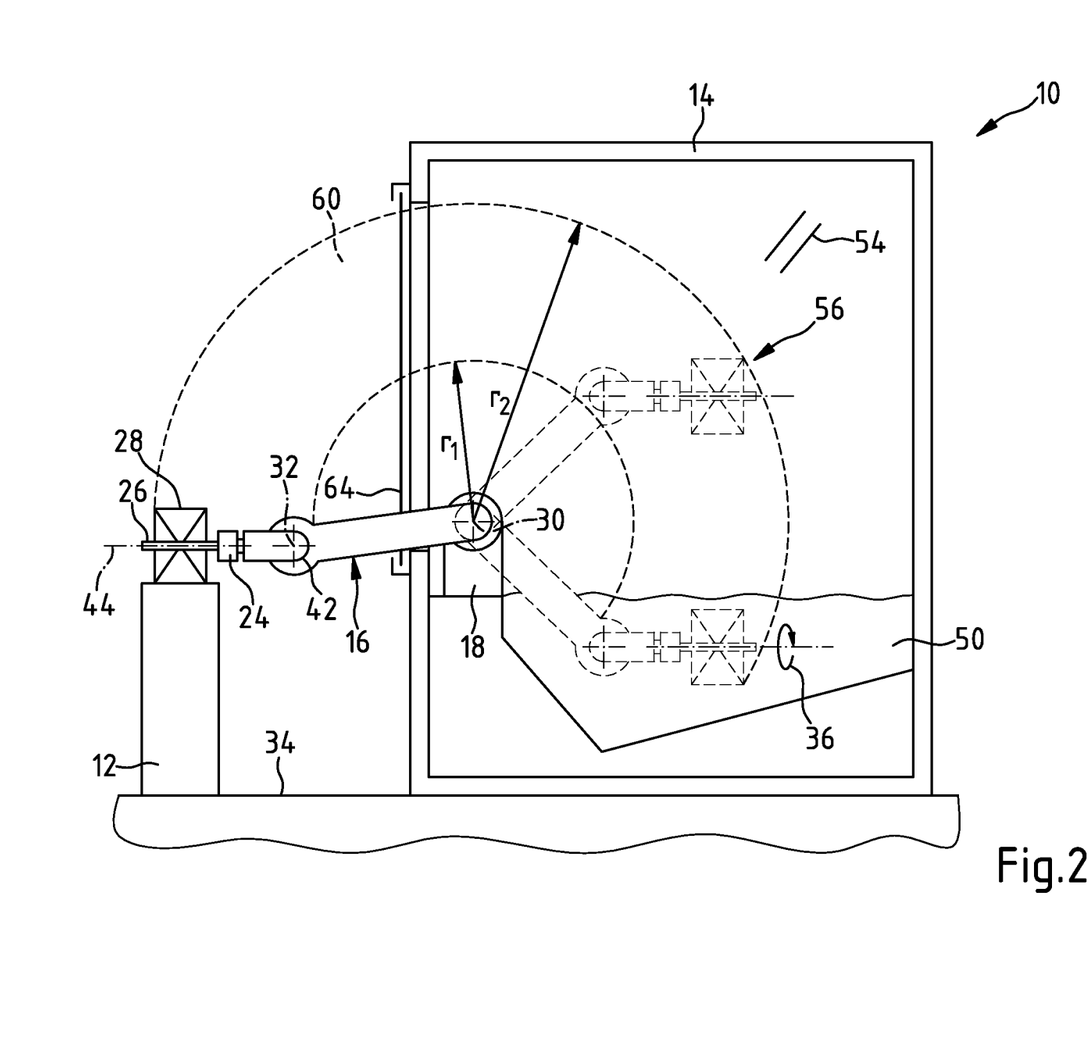
FIG. 2 shows an example treatment of the example workpiece in the first example system of FIG. 1.

FIG. 2 shows an example treatment of the example workpiece 28 in the first example system 10 of FIG. 1. In the illustrated example, the workpiece holder 26 picks up and moves the workpiece 28 via the handling device 16. In the illustrated example, the movement of the workpiece 28 occurs in a plane perpendicular to the first pivot axis 30 and the second pivot axis 32 within an example circular ring sector 60 of an example circular ring that is concentric with respect to the first pivot axis 30.

In the illustrated example of FIG. 2, the supporting arm 20 of the handling device 16 is capable of being pivoted out of the process chamber 14 through the open sliding door 64 such that the workpiece holder 26 of the handling device 16 may pick up the workpiece 28 that is positioned outside of the process chamber 14 on the workpiece feeder 12. In the illustrated example, the workpiece 28 that is picked up at the workpiece feeder 12 may be moved through the open sliding door 64 into the process chamber 14 as a result of the supporting arm 20 being pivoted about the first pivot axis 30. In the illustrated example, the supporting arm 20 of the handling device 16 may be pivoted about the first pivot axis 30 beyond the base 18 of the handling device 16.

Figure 3:
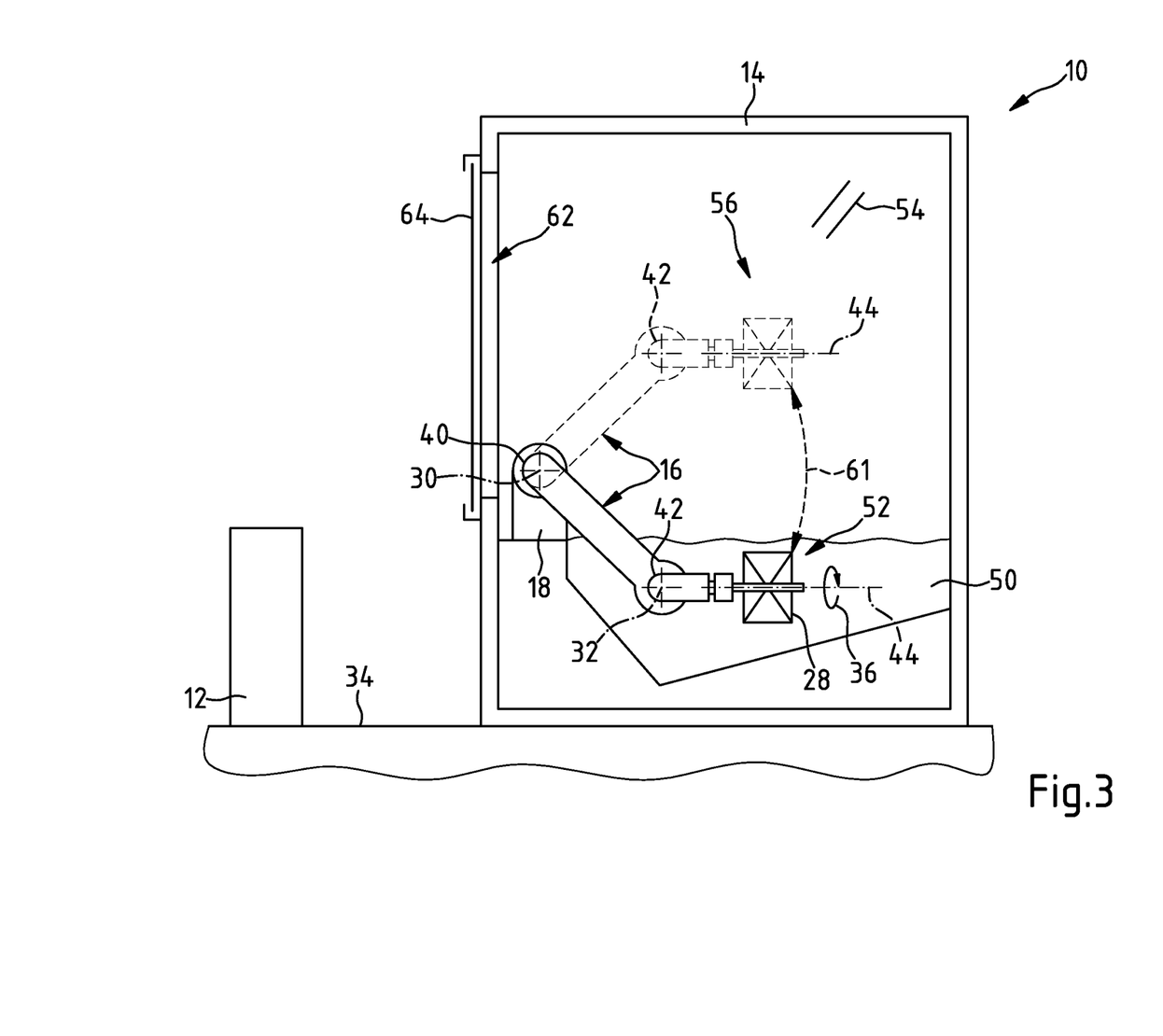
FIG. 3 shows the example workpiece in the first example system having been moved by the example handling device of FIG. 1.

FIG. 3 shows the example workpiece 28 in the first example system 10 having been moved by the example handling device 16 of FIG. 1. In the illustrated example, the workpiece 28 has been picked up by the workpiece holder 26 of the handling device 16 and moved, via the supporting arm 20 pivoting about the first pivot axis 30 and further via the pivoting arm 22 pivoting about the second pivot axis 32, along an example movement path 61 from a first example treatment position 52, in which the workpiece 28 is washed in the washing station 50, to a second example treatment position 56 for the drying of the workpiece 28 in the drying station 54. The movement path 61 corresponds to a combination of two circular movements of the workpiece 28, namely a pivoting movement about the first pivot axis 30 and a further pivoting movement about the second pivot axis 32.

In the illustrated example of FIG. 3, the workpiece 28, when in the first treatment position 52 or the second treatment position 56, is capable of being rotated on the handling device 16 about the third pivot axis 44 according to the example arrow 36. Such rotary movement may allow the workpiece 28 to be shifted and/or repositioned in the wash station 50 or in the drying station 54 to permit particularly efficient washing or drying of the workpiece 28. The relative pivotal movement(s) of one or more of the supporting arm 20, the pivoting arm 22 and/or the receptacle 24 enables the handling device 16 to move the workpiece 28 into any position located within the circular ring sector 60 of FIG. 2. As a result, the example system 10 of FIGS. 1-3 provides for an extremely compact treatment and/or cleaning system.

In addition or as an alternative to the washing station 50 and/or the drying station 54 of FIGS. 1-3, the example process chamber 14 of the example system 10 may include other treatment stations such as, for example, cleaning and debarring systems and/or stations having targeted spray systems, systems and/or stations having high pressure nozzles and/or brushes, or steam cleaning systems and/or stations. In accordance with the teachings of this disclosure, a workpiece may be treated by any of the aforementioned alternate treatment stations in one or more treatment positions that lie within a circular ring sector (e.g., the example circular ring sector 60) defined by the movement of the pivoting arm 22 and of the supporting arm 20.

In some examples, an additional and/or alternate handling device having only one pivot joint and/or having only one pivot axis, if any at all, may also be provided in the example system 10 of FIGS. 1-3.

Figure 4:
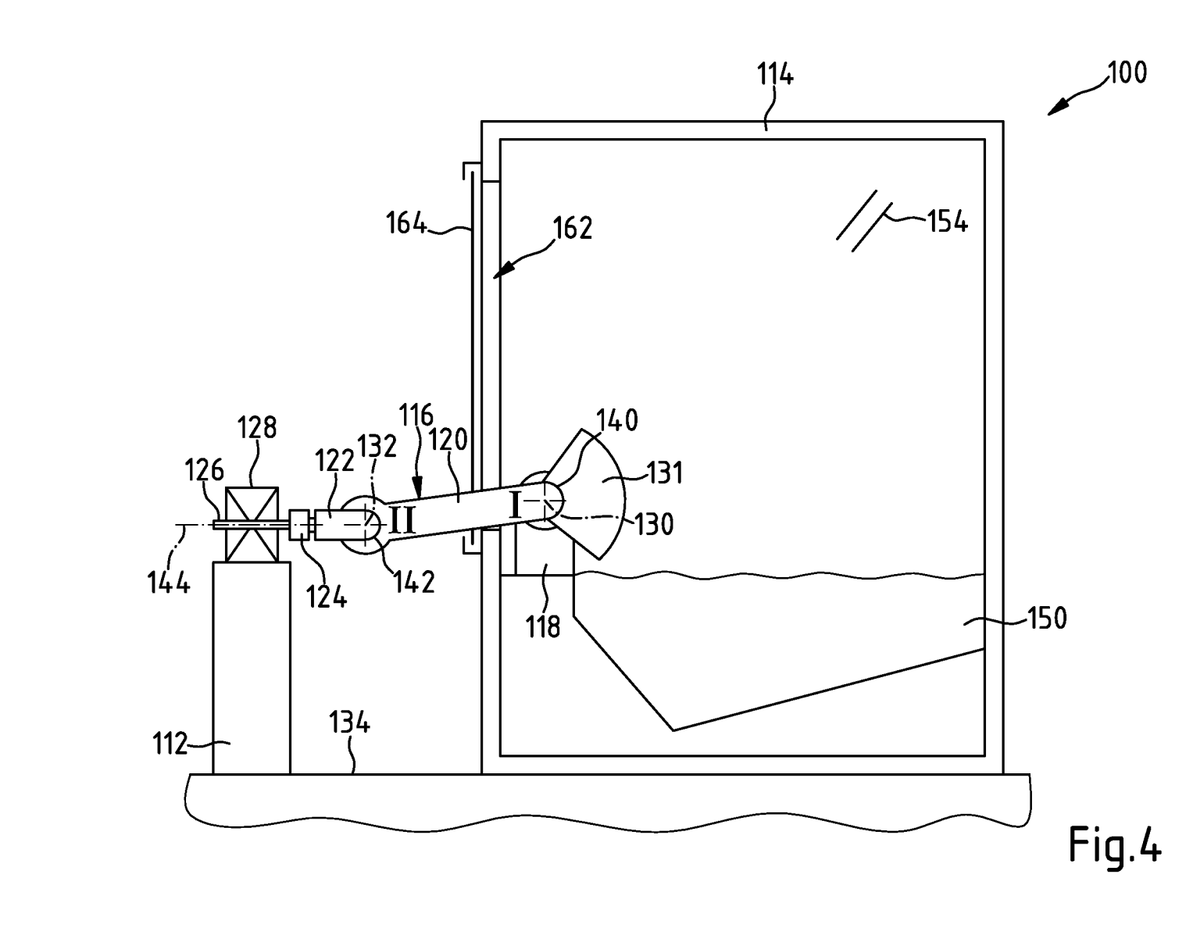
FIG. 4 shows a second example system having an example process chamber and an example handling device for treating an example workpiece.

FIG. 4 shows a second example system 100 having an example process chamber 114 and an example handling device 116 for treating an example workpiece 128. In the illustrated example, the system 100 is designed as a cleaning system. The example assemblies and/or example components of the second example system 100 of FIG. 4 that correspond to the example assemblies and/or example components of the above-described first example system 10 of FIGS. 1-3 are generally identified in FIG. 4 by reference numerals that have been increased by a value of one-hundred (100) relative to the corresponding reference numerals associated with FIGS. 1-3. For example, the example supporting arm 120 of FIG. 4 corresponds to the example supporting arm 20 of FIGS. 1-3.

In the illustrated example of FIG. 4, an example counterweight 131 is connected to the example supporting arm 120 of the example handling device 116. The counterweight 131 is configured to at least partially compensate for a load torque caused in the example first pivot axis 130 as a result of the handling device picking up the example workpiece 128. The counterweight 131 shifts the mass center of gravity of the handling device 116 into the vicinity of the first pivot axis 130, thereby causing a reduction in the lever forces that a drive assigned to the first pivot axis 130 may need to overcome.

Figures 5, 6:
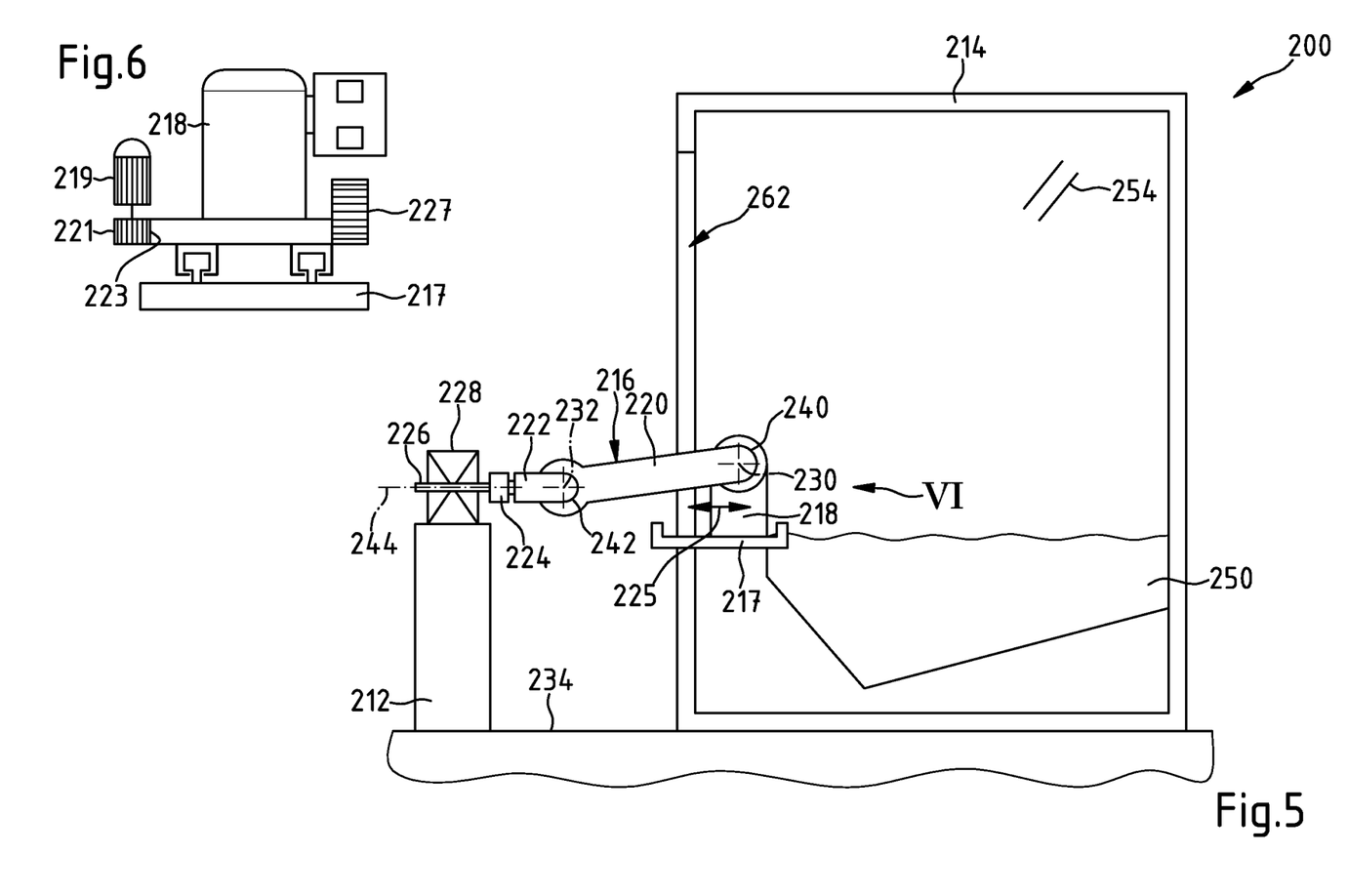
FIG. 5 shows a third example system having an example process chamber and an example handling device for treating an example workpiece.
FIG. 6 shows a partial view of the third example system of FIG. 5 taken in the direction of the arrow VI of FIG. 5.

FIG. 5 shows a third example system 200 having an example process chamber 214 and an example handling device 216 for treating an example workpiece 228. The example assemblies and/or example components of the third example system 200 of FIG. 5 that correspond to the example assemblies and/or example components of the above-described first example system 10 of FIGS. 1-3 are generally identified in FIG. 5 by reference numerals that have been increased by a value of two-hundred (200) relative to the corresponding reference numerals associated with FIGS. 1-3. For example, the example supporting arm 220 of FIG. 5 corresponds to the example supporting arm 20 of FIGS. 1-3. FIG. 6 shows a partial view of the third example system 200 of FIG. 5 taken in the direction of the arrow VI of FIG. 5.

In the illustrated example of FIGS. 5-6, the example base 218 of the example handling device 216 is guided in a linear manner within the process chamber 214 along an example horizontal rail 217. The base 218 is capable of being shifted along the rail 217 in the direction of the example double arrow 225 shown in FIG. 5 via an example electric drive 219 that drives an example pinion 221. In the illustrated example, the pinion 221 engages an example rack 223 that is coupled to the base 218. The engagement of the rack 223 with the pinion 221 enables the rack 221 and the base 218 to move relative to the rail 217 in the direction of the double arrow 225. In the illustrated example, an example trailing cable 227 positioned in the process chamber 214 supplies the electric drive 219 with electric current.

Figure 7:
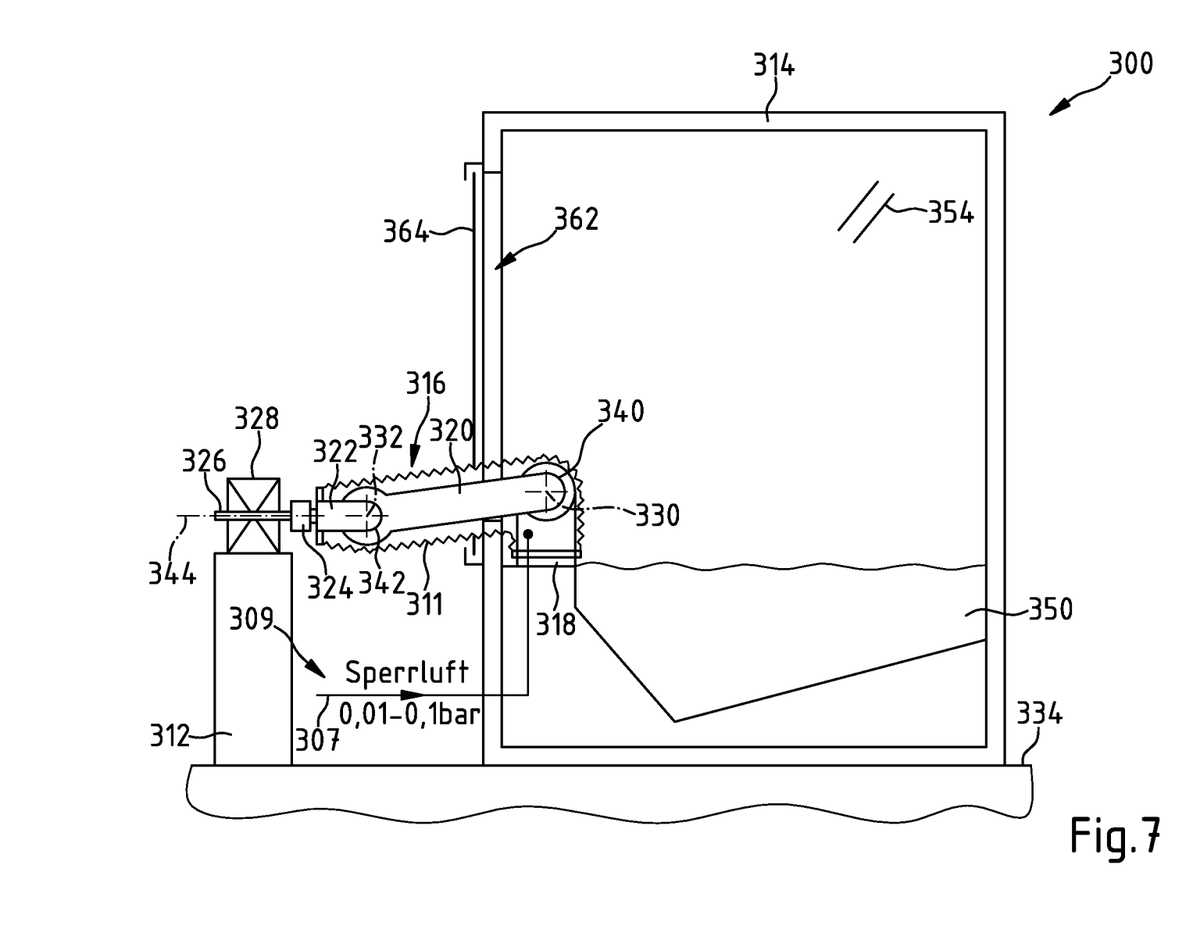
FIG. 7 shows a fourth example system having an example process chamber and an example handling device for treating an example workpiece.

FIG. 7 shows a fourth example system 300 having an example process chamber 314 and an example handling device 316 for treating an example workpiece 328. The example assemblies and/or example components of the fourth example system 300 of FIG. 7 that correspond to the example assemblies and/or example components of the above-described first example system 10 of FIGS. 1-3 are generally identified in FIG. 7 by reference numerals that have been increased by a value of three-hundred (300) relative to the corresponding reference numerals associated with FIGS. 1-3. For example, the example supporting arm 320 of FIG. 7 corresponds to the example supporting arm 20 of FIGS. 1-3. In the illustrated example of FIG. 7, the example handling device 316 includes an example flexible protective covering 311. In the illustrated example, the flexible protective covering 311 covers the rotary joints (e.g., rotary joint 340 of FIG. 7) of the handling device 316. In the illustrated example, the flexible protective covering 311 is media-resistant with respect to the fluid that is used to treat and/or clean the workpiece 328 at the example first treatment station 350 and/or the example second treatment station 354.

In the illustrated example of FIG. 7, the flexible protective covering 311 is advantageously composed of the material Teflon. The flexible protective covering 311 may alternatively be composed of Viton, silicone rubber or polyamide. The example system 300 of FIG. 7 includes an example device 309 for providing barrier air supplied via an example barrier air line 307 into the interior of the flexible protective covering 311 at a pressure within the range of 0.001 to 0.1 bar. As a result of the provision of such barrier air, fluid that is used to treat and/or clean the workpiece 328 in the process chamber 314 is unable to penetrate the interior of the flexible protective covering 311.

Figure 8:
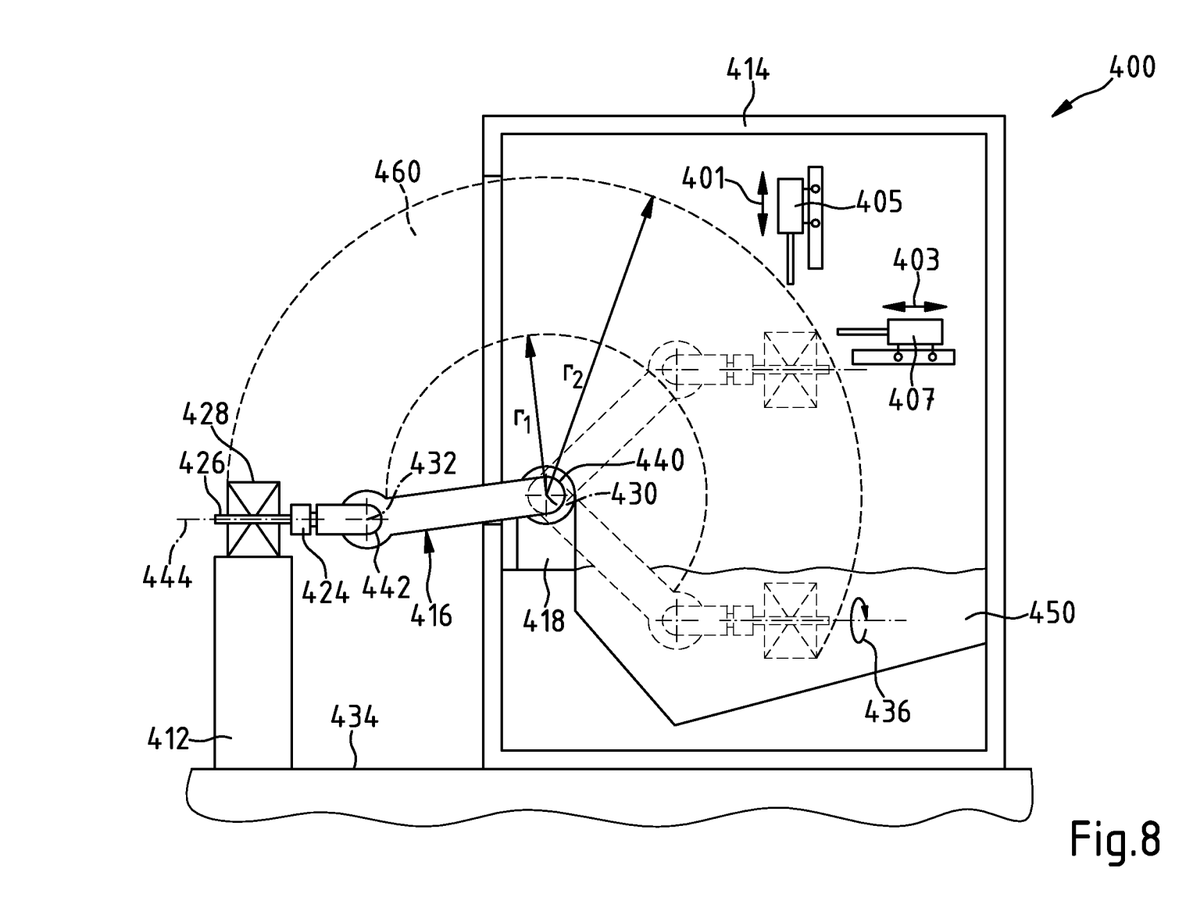
FIG. 8 shows a fifth example system having an example process chamber and an example handling device for treating an example workpiece.

FIG. 8 shows a fifth example system 400 having an example process chamber 414 and an example handling device 416 for treating an example workpiece 428. The example assemblies and/or example components of the fifth example system 400 of FIG. 8 that correspond to the example assemblies and/or example components of the above-described first example system 10 of FIGS. 1-3 are generally identified in FIG. 8 by reference numerals that have been increased by a value of four-hundred (400) relative to the corresponding reference numerals associated with FIGS. 1-3. For example, the example supporting arm 420 of FIG. 8 corresponds to the example supporting arm 20 of FIGS. 1-3. In the illustrated example of FIG. 8, the example system 400 includes example spraying, blowing and high pressure tools 405, 407 that are capable of being shifted in a linear manner within the process chamber 214 along the respective directions of the example arrows 401, 403.

Figures 9, 10:
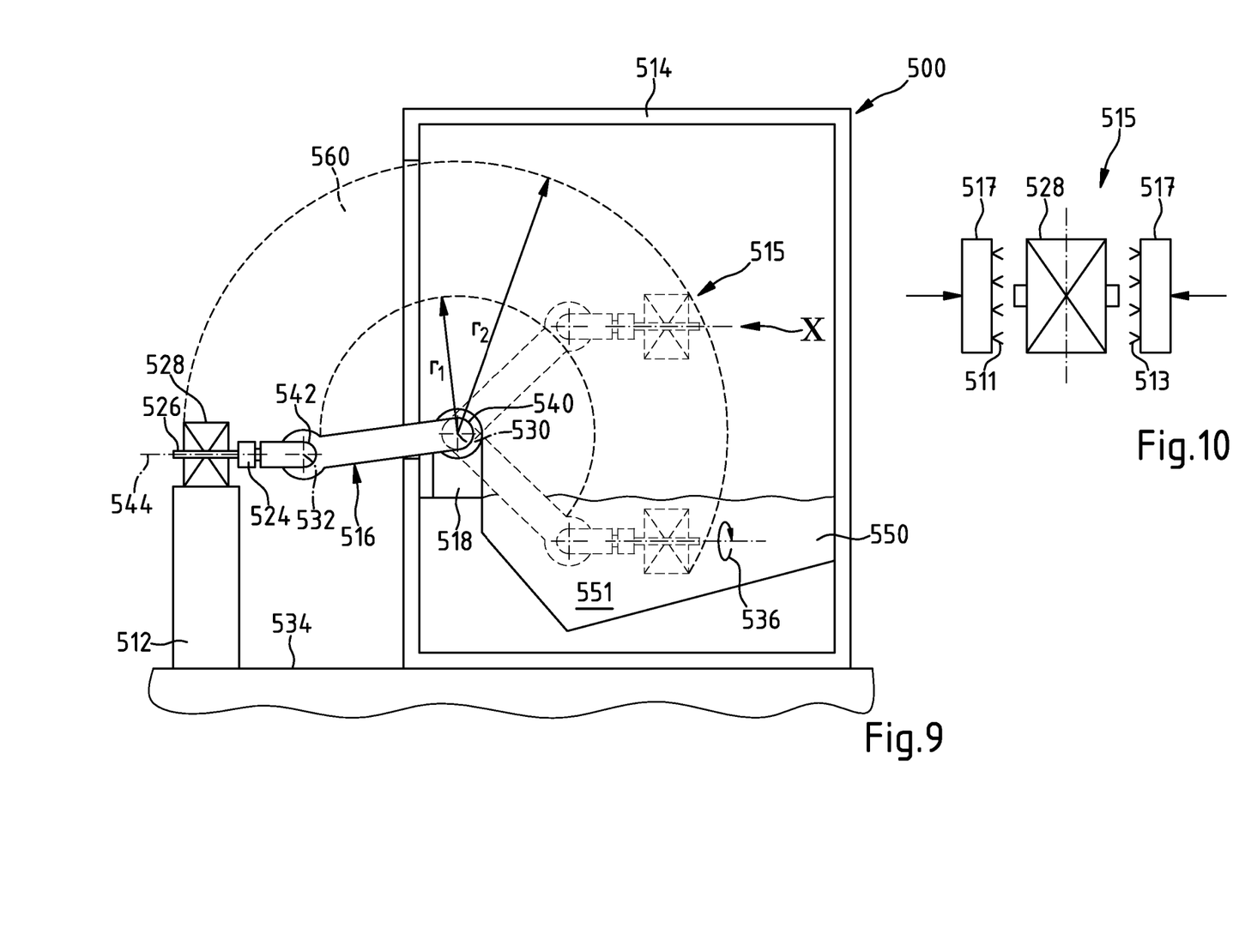
FIG. 9 shows a sixth example system having an example process chamber and an example handling device for treating an example workpiece.
FIG. 10 shows a partial view of the sixth example system of FIG. 9 taken in the direction of the arrow X of FIG. 9.

FIG. 9 shows a sixth example system 500 having an example process chamber 514 and an example handling device 516 for treating an example workpiece 528. The example assemblies and/or example components of the sixth example system 500 of FIG. 9 that correspond to the example assemblies and/or example components of the above-described first example system 10 of FIGS. 1-3 are generally identified in FIG. 9 by reference numerals that have been increased by a value of five-hundred (500) relative to the corresponding reference numerals associated with FIGS. 1-3. For example, the example handling device 516 of FIG. 9 corresponds to the example handling device 16 of FIGS. 1-3. FIG. 10 shows a partial view of the sixth example system 500 of FIG. 9 taken in the direction of the arrow X of FIG. 9.

In the illustrated example of FIGS. 9-10, the example system 500 includes an example treatment station 515 having an example cleaning tool 517 that is positioned in the process chamber 514. As a result of the handling device 516 moving the workpiece 528 to a location in the process chamber that coincides with that of the treatment station 515 and/or the cleaning tool 517, the sides of the workpiece 528 may be subjected to cleaning fluid flowing out of example nozzles 511, 513 of the cleaning tool 517. In the illustrated example, the handling device 516 is capable of positioning the workpiece 528 between the example nozzles 511 and the example nozzles 513 of the cleaning tool 517. In the illustrated example, the example system 500 further includes an example washing station 550 in which the workpiece 528 may be dipped into an example cleaning liquid 551.

Figure 11:
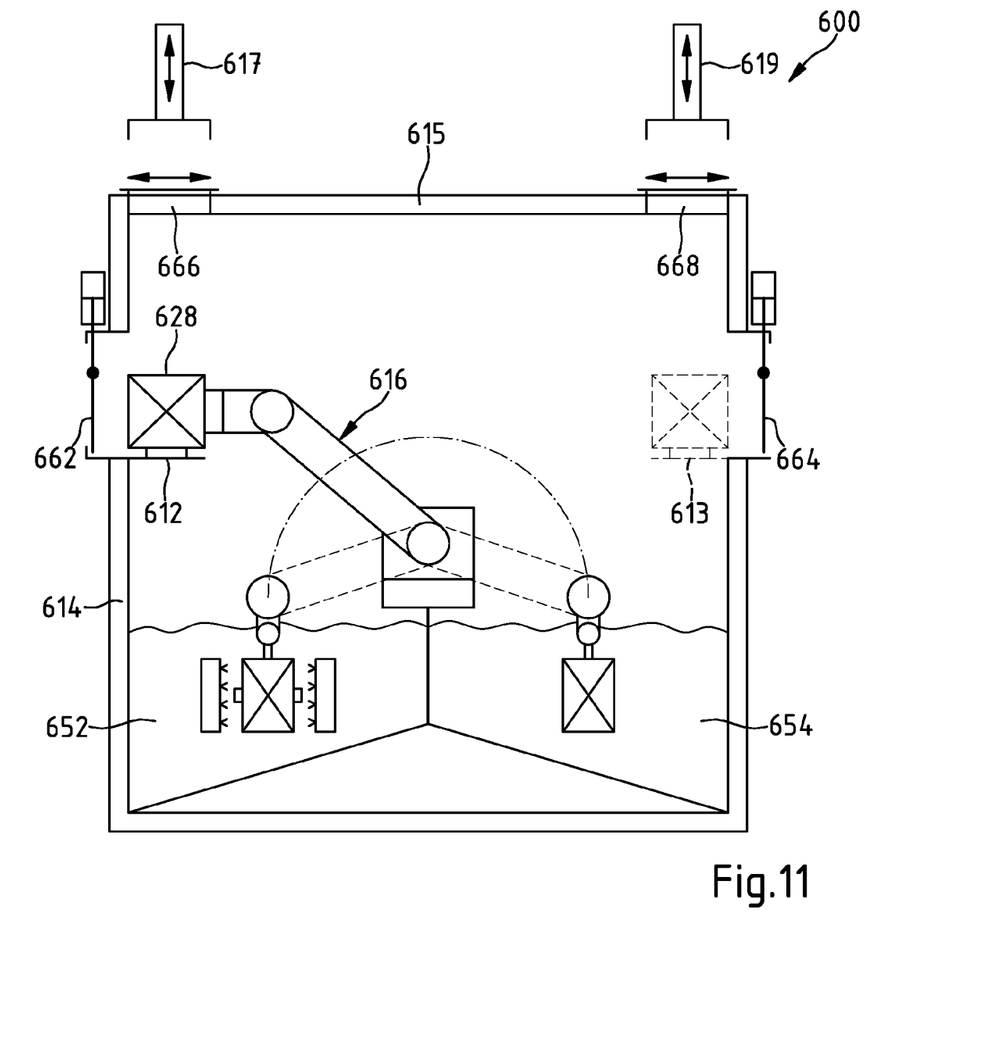
FIG. 11 shows a seventh example system having an example process chamber and an example handling device for treating an example workpiece.

FIG. 11 shows a seventh example system 600 having an example process chamber 614 and an example handling device 616 for treating and/or cleaning an example workpiece 628. In the illustrated example of FIG. 11, the example system 600 includes an example first treatment station 652 and an example second treatment station 654, both of which are located in the process chamber 614. In the illustrated example, the workpiece 628 may be provided to the handling device 616 through an example first sliding door 662 on an example workpiece feeder 612 located in the process chamber 614. In the illustrated example, the handling device 616 may then move the workpiece 628 from the workpiece feeder 612 to the example first treatment station 652, and from the example first treatment station 652 to the example second treatment station 654. After treatment in the second treatment station 654, the treated workpiece 628 may be provided on an example workpiece dispenser 613 from where the workpiece 628 may be retrieved via an operator or a manipulator (not shown) through an example second sliding door 664.

In the illustrated example of FIG. 11, the example process chamber 614 of the example system 600 may additionally and/or alternatively be designed as a "top loader" in which workpieces (e.g., the example workpiece 628) may be moved into the process chamber 614 or retrieved from the process chamber 614 through corresponding example closable openings 666, 668 in an example ceiling 615 of the process chamber 614 via corresponding example manipulators 617, 619.

Figure 12:
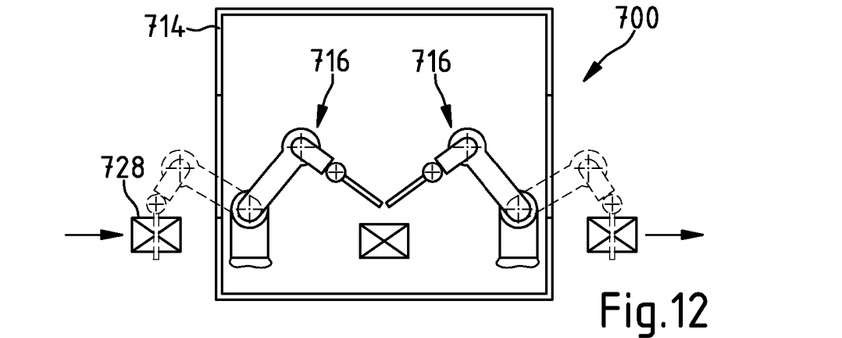
FIG. 12 shows an eighth example system having an example process chamber and a plurality of example handling devices for treating an example workpiece.

FIG. 12 shows an eighth example system 700 having an example process chamber 714 and a plurality of example handling devices 716 for treating an example workpiece 728. The construction of the eighth example system 700 otherwise corresponds to the construction of the first example system 10 described above in connection with FIGS. 1-3. The example assemblies and/or example components of the eighth example system 700 of FIG. 12 that correspond to the example assemblies and/or example components of the above-described first example system 10 of FIGS. 1-3 are generally identified in FIG. 12 by reference numerals that have been increased by a value of seven-hundred (700) relative to the corresponding reference numerals associated with FIGS. 1-3.

Figure 13:
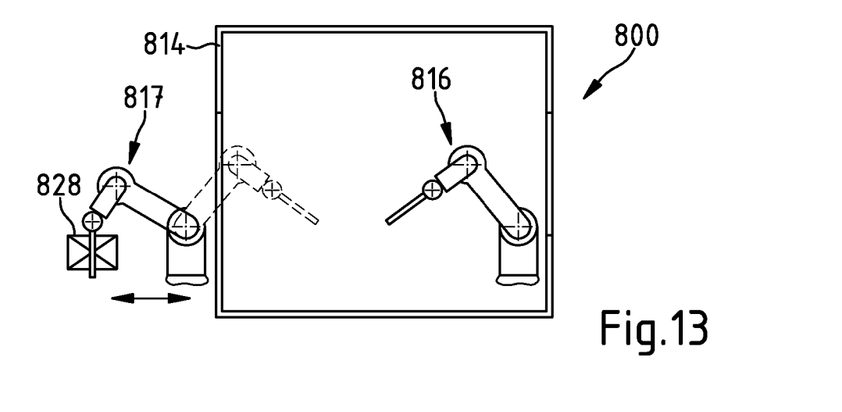
FIG. 13 shows a ninth example system having an example process chamber and a plurality of example handling devices for treating an example workpiece.

FIG. 13 shows a ninth example system 800 having an example process chamber 814 and a plurality of example handling devices 816, 817 for treating an example workpiece 828. In the illustrated example, an example first handling device 816 is positioned in the interior of the process chamber 814 of the system 800. In the illustrated example, an example second handling device 817 is positioned outside the process chamber 814 of the system 800. The construction of the example first handling device 816 and the example second handling device 817 in the ninth example system 800 corresponds to the construction of the example handling device 16 in the first example system 10 described above in connection with FIGS. 1-3. The example assemblies and/or example components of the ninth example system 800 of FIG. 13 that correspond to the example assemblies and/or example components of the above-described first example system 10 of FIGS. 1-3 are generally identified in FIG. 13 by reference numerals that have been increased by a value of eight-hundred (800) relative to the corresponding reference numerals associated with FIGS. 1-3.

Figure 14:
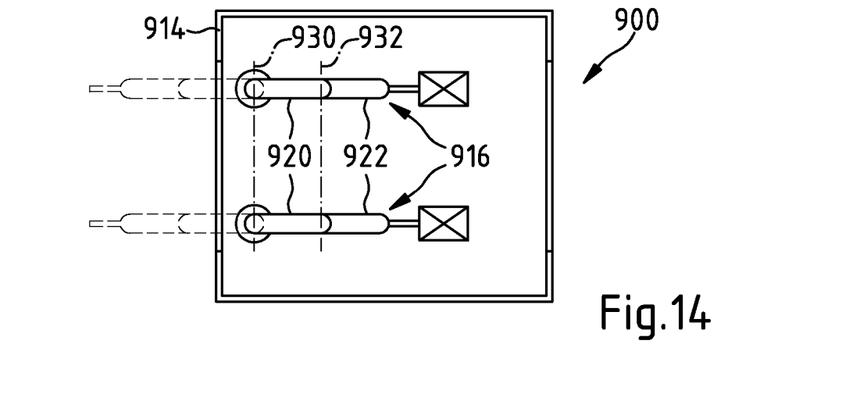
FIG. 14 shows a tenth example system having an example process chamber and a plurality of example handling devices for treating an example workpiece.

FIG. 14 shows a tenth example system 900 having an example process chamber 914 and a plurality of example handling devices 916 for treating an example workpiece 928. In the illustrated example, the construction of the example handling devices 916 corresponds to the construction of the example handling device 16 described above in connection with FIGS. 1-3. In the illustrated example, respective ones of the handling devices 916 include an example first pivotal axis 930 and an example second pivotal axis 932. In the illustrated example, the respective first pivotal axes 930 of the handling devices 916 are aligned, as are the respective second pivotal axes 932.

Figure 15:
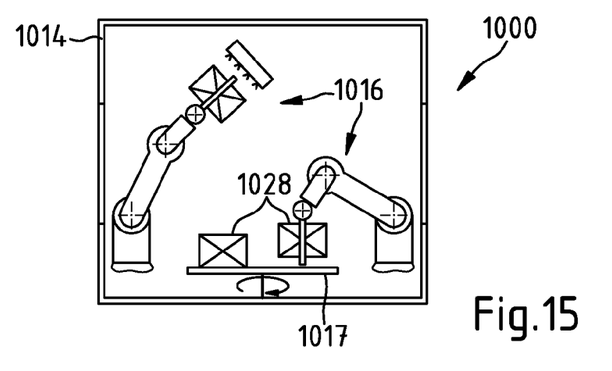
FIG. 15 shows an eleventh example system having an example process chamber and a plurality of example handling devices for treating an example workpiece.

FIG. 15 shows an eleventh example system 1000 having an example process chamber 1014 and a plurality of example handling devices 1016 for treating an example workpiece 1028. In the illustrated example, the construction of the example handling devices 1016 corresponds to the construction of the example handling device 16 described above in connection with FIGS. 1-3. In the illustrated example of FIG. 15, the example system 1000 includes an example revolving washer having an example rotary plate 1017 for shifting the workpiece 1028.

Figure 16:
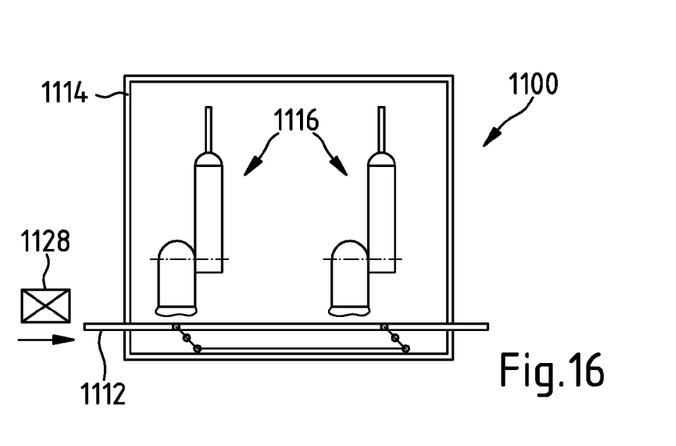
FIG. 16 shows a twelfth example system having an example process chamber and a plurality of example handling devices for treating an example workpiece.

FIG. 16 shows a twelfth example system 1100 having an example process chamber 1114 and a plurality of example handling devices 1116 for treating an example workpiece 1128. In the illustrated example of FIG. 16, the example system 1100 includes an example workpiece feeder 1112 that is configured as a lifting beam transport device. In the illustrated example, the handling devices 1116 may pick up workpieces (e.g., the example workpiece 1128) fed into the process chamber 1114 via the workpiece feeder 1112.

Figure 17:
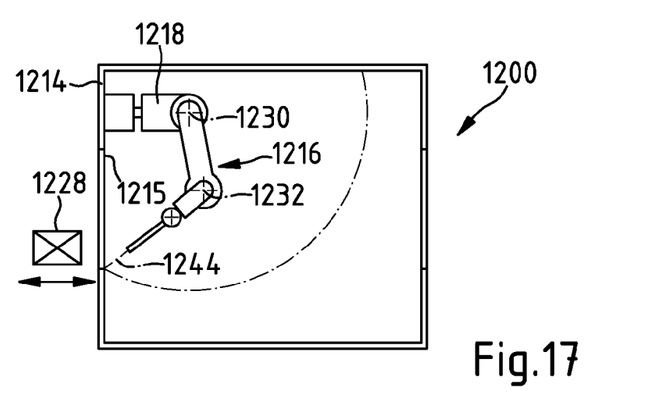
FIG. 17 shows a thirteenth example system having an example process chamber and an example handling device for treating an example workpiece.

FIG. 17 shows a thirteenth example system 1200 having an example process chamber 1214 and an example handling device 1216 for treating an example workpiece 1228. In the illustrated example of FIG. 17, the handling device 1216 includes an example first pivotal axis 1230, an example second pivotal axis 1232, and an example third pivotal axis 1244. In the illustrated example, the handling device 1216 further includes an example base 1218 that capable of being shifted in a linear manner along an example wall 1215 of the process chamber 1214.

In some disclosed examples, a cost-effective system having a compact size is provided for treating workpieces. In some disclosed examples, a system for treating workpieces includes at least one treatment station positioned within a process chamber. In some disclosed examples, a workpiece positioned in a treatment position at the at least one treatment station is capable of being treated with a fluid. In some disclosed examples, the system includes a workpiece feeder. In some disclosed examples, the system includes a handling device that is capable of picking up the workpiece from the workpiece feeder. In some disclosed examples, the handling device is capable of moving the workpiece from the workpiece feeder into the treatment position at the at least one treatment station.

In some disclosed examples, the handling device includes a base. In some disclosed examples, the handling device includes a supporting arm that is coupled to the base and is pivotable relative to the base about a first pivot axis. In some disclosed examples, the handling device includes a pivoting arm that is coupled to the supporting arm and is pivotable relative to the supporting arm about a second pivot axis. In some disclosed examples, the handling device includes a receptacle that is coupled to the pivoting arm and is pivotable relative to the pivoting arm about a third pivot axis. In some disclosed examples, the receptacle includes a workpiece holder for picking up the workpiece. In some disclosed examples, the third pivot axis lies in a plane through which the second pivot axis passes. In some disclosed examples, the second pivot axis is parallel to the first pivot axis. In some disclosed examples, the third pivot axis is perpendicular to the second pivot axis and the first pivot axis.

In some disclosed examples, the first pivot axis is a horizontal pivot axis. In some disclosed examples, the supporting arm is arranged perpendicularly to the first pivot axis such that the supporting arm pivots about the first pivot axis along a plane that is perpendicular to the first pivot axis. As a result of the supporting arm pivoting about the first pivot axis along a plane that is perpendicular to the first pivot axis, the process chamber may include a relatively narrow opening to accommodate the movement of a workpiece by the supporting arm of the handling device from the workpiece feeder into the process chamber.

In some disclosed examples, the base of the handling device is fixed relative to the process chamber. In some disclosed examples, the base of the handling device is located in the interior of the process chamber. As a result of the base of the handling device being located in the interior of the process chamber, the workpiece may be moved in the process chamber via the handling device without a complicated lead-through into the process chamber being required for the handling device. Such lead-throughs into a process chamber for handling devices disadvantageously require protective films or slats which not only restrict a movement of handling devices but also subject the latter to wear, which necessitates regular maintenance and exchange.

In some disclosed examples, the process chamber includes an opening capable of being opened and closed via a fluid-tight closing device. In some disclosed examples, the workpiece may be delivered from a location inside of the process chamber to a location outside of the process chamber via the opening in the process chamber. In some disclosed examples, the workpiece may be picked up from a location outside of the process chamber and moved to a location inside of the process chamber via the opening in the process chamber.

In some disclosed examples, the handling device includes assemblies or components composed of chemically inert and temperature-stable materials that allow for the handling device to operate reliably in the process chamber. In some disclosed examples, the handling device includes assemblies or components composed of stainless steel. In some disclosed examples, the handling device includes assemblies or components composed of nickel-plated aluminum. In some disclosed examples, the handling device includes assemblies or components that are chromium-plated. In some disclosed examples, one or more sealing bodies of the handling device is advantageously composed of a material that can be exposed to high temperatures and aggressive media. In some disclosed examples, the handling device arranged in the process chamber includes assemblies or components composed of a carbon fiber reinforced plastic (CFRP) material for absorbing forces. In some disclosed examples, the handling device includes one or more assemblies or components that can be subjected to barrier air for preventing media used in the process chamber for treating workpieces from penetrating cavities and joint sections of the handling device. In some disclosed examples, electric and pneumatic supply lines of the handling device such as, for example, for drives and grippers, are advantageously positioned in the interior of movement arms of the handling device such as, for example, the supporting arm or the pivoting arm such that the operation of the handling device is not disturbed by the fluid to which the workpiece in the process chamber is subjected.

In some disclosed examples, the handling device includes no more than three movement axes. In some disclosed examples, the handling device contains exactly three movement axes. In some disclosed examples, the three movement axes enable the handling device to pick up a workpiece located outside of the process chamber and to move the workpiece to a treatment station located inside of the process chamber where the workpiece may be treated. In some disclosed examples, the handling device including no more than three movement axes is comparatively cost-effective relative to a handling device including more than three movement axes. In some disclosed examples, the handling device includes a pivoting arm that is coupled to a supporting arm and is pivotable relative to the supporting arm about a pivot axis.

In some disclosed examples, a movement space of the handling device may be determined based on the selection of the lengths and length ratios of the supporting arm and the pivoting arm, and further based on the selection of the orientation of the pivot axes. In some disclosed examples, the movement space corresponds to the space in which the workpiece that is picked up by the handling device is capable of being moved. In some disclosed examples, a ratio of the length of the supporting arm to the pivoting arm is preferably 10:1, more preferably 5:1, and more preferably 5:2, most preferably greater than 4:1.

In some disclosed examples, the receptacle may be formed integrally with the workpiece holder. In some disclosed examples, the receptacle may be formed to accommodate different workpiece holders such that a plurality of optionally different workpieces may be moved simultaneously in the process chamber by the handling device.

In some disclosed examples, the first pivot axis of the handling device is a horizontal pivot axis. In some disclosed examples, the handling device is advantageously capable of moving a workpiece that has been picked up by the workpiece holder from the workpiece feeder into the process chamber by pivoting the supporting arm of the handling device about the first pivot axis.

In some disclosed examples, the handling device is advantageously capable of moving a workpiece that has been picked up by the workpiece holder into a treatment position at the at least one treatment station by pivoting the supporting arm of the handling device about the first pivot axis.

In some disclosed examples, the process chamber includes a plurality of treatment stations. In some disclosed examples, the process chamber includes a first treatment station and a second treatment station spaced apart from the first treatment station. In some disclosed examples, the first treatment station is capable of treating the workpiece positioned in a first treatment position with a fluid. In some disclosed examples, the second treatment station is capable of treating the workpiece positioned in a second treatment position with a fluid that may be the same fluid or a different fluid relative to that with which the workpiece is treated at the first treatment station. In some disclosed examples, the handling device moves the workpiece from the first treatment position at the first treatment station to the second treatment position at the second treatment station by pivoting the supporting arm about the first pivot axis.

In some disclosed examples, the handling device moves the workpiece along a plane that is perpendicular to the first pivot axis within a circular ring sector of a circular ring that is concentric with respect to the first pivot axis. In some disclosed examples, the first treatment position and the second treatment position are respectively positioned within the circular ring sector.

In some disclosed examples, a treatment station that is arranged in the process chamber and is intended for treating a workpiece positioned in a treatment position is capable of treating a workpiece with a fluid. In some disclosed examples, a treatment station that is arranged in the process chamber and is intended for treating a workpiece positioned in a treatment position is capable of subjecting the workpiece to a flood washing treatment. In some disclosed examples, a treatment station that is arranged in the process chamber and is intended for treating a workpiece positioned in a treatment position is capable of deburring the workpiece. In some disclosed examples, a treatment station that is arranged in the process chamber and is intended for treating a workpiece positioned in a treatment position is capable of subjecting the workpiece to a drying treatment. In some disclosed examples, the treatment station in the process chamber includes spray systems or steam cleaning systems. In some disclosed examples, the treatment station in the process chamber includes high pressure nozzles and/or brushes.

In some disclosed examples, a method for treating workpieces utilizes a process chamber that is closable in a fluid-tight manner. In some disclosed examples, the process chamber utilized by the method includes at least one treatment station at which the workpiece, when positioned in a treatment position, is treated with a fluid. In some disclosed examples, the method includes moving the workpiece via a handling device located in the process chamber by pivoting the handling device about a pivot axis along a movement path that lies within a circular ring sector of a circular ring, the circular ring being concentric with respect to the pivot axis.

In some disclosed examples, a method for treating a workpiece includes picking up the workpiece from a workpiece feeder positioned outside of a process chamber. In some disclosed examples, the workpiece is picked up via a handling device. In some disclosed examples, the handling device includes a base that is fixed in the process chamber or is positioned in a linearly movable manner in the process chamber. In some disclosed examples, the handling device includes a supporting arm that is coupled to the base and is pivotable relative to the base about a first pivot axis. In some disclosed examples, the handling device includes a pivoting arm that is coupled to the supporting arm and is pivotable relative to the supporting arm about a second pivot axis. In some disclosed examples, the handling device includes a receptacle that is coupled to the pivoting arm. In some disclosed examples, the receptacle includes a workpiece holder capable of picking up the workpiece from the workpiece feeder.

In some disclosed examples, the method for treating the workpiece includes moving the workpiece, via the handling device, from outside of the process chamber, through an opening of the process chamber that is closeable in a fluid-tight manner, and into a first treatment position at a first treatment station positioned inside of the process chamber. In some disclosed examples, the method for treating the workpiece includes subjecting the workpiece to fluid at the first treatment station. In some disclosed examples, the method for treating the workpiece includes moving the workpiece, via the handling device, from the first treatment position at the first treatment station into a second treatment position at a second treatment station positioned inside of the process chamber. In some disclosed examples, the method for treating the workpiece includes subjecting the workpiece to fluid at the second treatment station. In some disclosed examples, the method for treating the workpiece includes moving the workpiece from the first treatment position at the first treatment station into the second treatment position at the second treatment station by pivoting the supporting arm of the handling device about the first pivot axis.

In some disclosed examples, the first treatment station utilized in the method for treating the workpiece is at least one of a flood washing station or a drying station. In some disclosed examples, the first treatment station includes nozzles from which fluid is emitted for treating the workpiece. In some disclosed examples, the second treatment station utilized in the method for treating the workpiece is at least one of a flood washing station or a drying station. In some disclosed examples, the second treatment station includes nozzles from which fluid is emitted for treating the workpiece.

It is noted that this patent arises from a continuation-in-part of International Patent Application No. PCT/EP2014/055879, which was filed on Mar. 24, 2014, which claims priority to German Patent Application No. 10 2013 206 875.1, which was filed on Apr. 16, 2013. The foregoing International Patent Application and German Patent Application are hereby incorporated herein by reference in their entireties.

Although certain example systems, apparatus and methods have been disclosed herein, the scope of coverage of this patent is not limited thereto. On the contrary, this patent covers all systems, apparatus and methods fairly falling within the scope of the claims of this patent.

What is claimed is:

1. A system for treating a workpiece, the system comprising:
 a process chamber having an opening that is closable in a fluid tight-manner;
 a first treatment station positioned in the process chamber for treating the workpiece with liquid fluid; and
 a handling device positioned in the process chamber, the handling device including:
  a base that is fixed in the process chamber or is positioned in a linearly movable manner in the process chamber;

a supporting arm that is coupled to the base and is pivotable relative to the base about a first pivot axis;

a pivoting arm that is coupled to the supporting arm and is pivotable relative to the supporting arm about a second pivot axis; and a receptacle that is coupled to the pivoting arm, the receptacle including a workpiece holder capable of picking up the workpiece from a workpiece feeder positioned outside of the process chamber;

wherein the handling device is capable of moving the workpiece from a location outside of the process chamber, through the opening of the process chamber, and into a first treatment position at the first treatment station.

2. The system as defined in claim 1, further including a second treatment station positioned in the process chamber for treating the workpiece with fluid, the second treatment station being spaced apart from the first treatment station, wherein the supporting arm of the handling device is capable of pivoting about the first pivot axis to move the workpiece from the first treatment position at the first treatment station into a second treatment position at the second treatment station.

3. The system as defined in claim 2, wherein the handling device is capable of moving the workpiece along a movement path that lies within a circular ring sector of a circular ring, the circular ring being concentric with respect to the first pivot axis, the first treatment position and the second treatment position being positioned within the circular ring sector.

4. The system as defined in claim 1, wherein the receptacle is pivotable relative to the pivoting arm about a third pivot axis, the third pivot axis lying in a plane through which the second pivot axis passes.

5. The system as defined in claim 1, wherein the first treatment station is at least one of a flood washing station, a deburring station, or a drying station.

6. The system as defined in claim 1, wherein the handling device includes an assembly capable of being subjected to barrier air to prevent fluid from penetrating a cavity or a joint section of the handling device.

7. The system as defined in claim 1, further including an electric supply line and a pneumatic supply line, the electric supply line and the pneumatic supply line being positioned in the handling device.

8. The system as defined in claim 1, wherein the handling device includes an assembly composed of chemically inert and temperature-stable materials.

9. The system as defined in claim 1, wherein the handling device includes an assembly composed of carbon fiber reinforced plastic.

10. The system as defined in claim 1, wherein the handling device includes a sealing body capable of being exposed to high temperatures and aggressive media.

11. The system as defined in claim 1, further including a flexible protective covering that at least partially covers the handling device, the flexible protective covering being resistant to fluid used in the first treatment station for treating the workpiece.

12. The system as defined in claim 1, further including a counterweight that is connected to the supporting arm, the counterweight being configured to compensate for a load torque in the first pivot axis.

13. The system as defined in claim 1, further including an additional handling device, the additional handling device being capable of picking up the workpiece from the workpiece feeder and moving the workpiece into the first treatment position at the first treatment station.

14. The system as defined in claim 1, wherein the workpiece feeder includes a transport system capable of shifting the workpiece.

15. A method for treating a workpiece, the method comprising:

picking up the workpiece from a workpiece feeder positioned outside of a process chamber, the workpiece being picked up via a handling device, the handling device including:

a base that is fixed in the process chamber or is positioned in a linearly movable manner in the process chamber;

a supporting arm that is coupled to the base and is pivotable relative to the base about a first pivot axis;

a pivoting arm that is coupled to the supporting arm and is pivotable relative to the supporting arm about a second pivot axis; and a receptacle that is coupled to the pivoting arm, the receptacle including a workpiece holder capable of picking up the workpiece from the workpiece feeder;

moving the workpiece, via the handling device, from a location outside of the process chamber, through an opening of the process chamber that is closeable in a fluid-tight manner, and into a first treatment position at a first treatment station positioned inside of the process chamber;

subjecting the workpiece to liquid fluid at the first treatment station;

moving the workpiece, via the handling device, from the first treatment position at the first treatment station into a second treatment position at a second treatment station positioned inside of the process chamber; and subjecting the workpiece to fluid at the second treatment station;

wherein moving the workpiece from the first treatment position at the first treatment station into the second treatment position at the second treatment station includes pivoting the supporting arm of the handling device about the first pivot axis.

16. The method as defined in claim 15, wherein the first treatment station is at least one of a flood washing station or a drying station.

17. The method as defined in claim 16, wherein the first treatment station includes nozzles from which fluid is emitted for treating the workpiece.

18. The method as defined in claim 16, wherein the second treatment station is at least one of a flood washing station or a drying station.

19. The method as defined in claim 18, wherein the second treatment station includes nozzles from which fluid is emitted for treating the workpiece.

* * * * *